United States Patent
Chapman

(10) Patent No.: US 10,562,331 B2
(45) Date of Patent: Feb. 18, 2020

(54) MONOCHROME DEVICE FLUORESCENT PANTOGRAPH

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/985,065

(22) Filed: May 21, 2018

(65) Prior Publication Data

US 2019/0351689 A1    Nov. 21, 2019

(51) Int. Cl.
| | | |
|---|---|---|
| *B41M 3/14* | (2006.01) | |
| *H04N 1/00* | (2006.01) | |
| *G06K 1/12* | (2006.01) | |
| *G03G 21/04* | (2006.01) | |
| *G07D 7/00* | (2016.01) | |

(52) U.S. Cl.
CPC ............ *B41M 3/146* (2013.01); *B41M 3/144* (2013.01); *G03G 21/043* (2013.01); *G06K 1/121* (2013.01); *G07D 7/003* (2017.05); *H04N 1/00883* (2013.01)

(58) Field of Classification Search
CPC ....... B41M 3/146; B41M 3/144; G06K 1/121; H04N 1/00883; G07D 7/003; G03G 21/043
USPC ........ 283/67, 70, 72, 74, 85, 89, 91, 93, 98, 283/113, 114, 901
See application file for complete search history.

(56) References Cited

U.S. PATENT DOCUMENTS

| | | |
|---|---|---|
| 4,168,088 A | 9/1979 | Somlyody |
| 4,210,346 A | 7/1980 | Mowry, Jr. et al. |
| 5,286,286 A | 2/1994 | Winnik et al. |
| 6,170,744 B1 * | 1/2001 | Lee ...................... G06Q 20/389 235/380 |
| 2005/0142469 A1 * | 6/2005 | Blood .................. G03G 15/326 430/10 |
| 2007/0281139 A1 * | 12/2007 | Mehta .................... B41M 3/142 428/195.1 |
| 2009/0207433 A1 | 8/2009 | Wang et al. |
| 2009/0212115 A1 | 8/2009 | Iftime et al. |

(Continued)

OTHER PUBLICATIONS

U.S. Appl. No. 15/852,003, filed Dec. 22, 2017, Chapman, et al.
(Continued)

*Primary Examiner* — Justin V Lewis
(74) *Attorney, Agent, or Firm* — Fay Sharpe LLP

(57) ABSTRACT

An original document is formed using a first print medium by printing a first and second monochrome patterns with a single colorant to form printed first and second regions including first and second shapes, respectively, which are devoid of the colorant. The second shapes have a smaller size and a higher frequency than the first shapes. The first and/or second regions encode information. The first and second patterns and a fluorescence of the first print medium are selected such that the first and second regions of the original document are indistinguishable to the naked eye, under both normal and ultraviolet illumination but are distinguishable, only under the ultraviolet illumination, in a copy formed by scanning the original document and printing the scanned document on a second print medium with a plurality of colorants, to reveal the encoded information.

20 Claims, 8 Drawing Sheets

(56) References Cited

U.S. PATENT DOCUMENTS

2010/0150433 A1     6/2010  Wang et al.
2014/0339808 A1*   11/2014  Pawlik .................. G07D 7/128
                                                                  283/85
2017/0039422 A1     2/2017  Eschbach et al.

OTHER PUBLICATIONS

G. F. Bailey, "Instrument for the Measurement of Fluorescence of Paper Chromatographic Spots," Anal. Chem., 32 (12), p. 1726 (1960).

* cited by examiner

MONOCHROME DEVICE FLUORESCENT PANTOGRAPH

BACKGROUND

The exemplary embodiment relates to systems and methods for limiting or detecting unauthorized copying of documents and finds particular application in connection with a system and method for encoding information in an original document using a single colorant, which is detectable under ultraviolet light in a copy of the original document but not in the original document.

As the quality of color copiers has improved, it has become easier to generate copies of a document which are indistinguishable from the original document. In many instances, the unauthorized copying of document content can have serious implications. For example, there is a concern that color copiers could be used to reproduce security documents, such as checks, stock certificates, automobile title instruments, and other documents of value, for illegal purposes.

One method which is used to authenticate documents and to reduce the unauthorized copying employs what is commonly called the VOID-pantograph. Techniques for creating such pantographs typically involve forming printed dots (or other elements) of two different sizes and frequencies, which are used to create regions of similar tone, corresponding to a textual warning and a background, respectively, in an original (authentic) document. Tone refers to the visual appearance produced by halftone dots, bars, or marks which cover at least a portion of a printed area and which usually have a frequency that is measured in dots, lines, or marks per inch. To provide constant tone, the smaller elements have a higher frequency than the larger elements. Because the tone of the textual warning and the tone of the background pattern are selected to be the substantially the same, these two regions have a similar visual impact on an observer of the original document, and the textual warning is not readily perceived.

On copying, however, the situation changes. Since the response of an image sensor employed in the scanner is different from the response of the human visual system, changes in the relative tone of the two different areas will appear. These changes are due to the different frequency response of the sensor (with respect to the human eye) and due to other, normally non-linear, effects, such as a detection floor or threshold, where signals below a certain level are simply "lost." In general, the high frequency, smaller components are more strongly affected and attenuated. The difference in response of the scanner expresses itself as a relative change in tone in the copy and thus the hitherto invisible textual warning becomes visible. For example, in the resulting copy, only the larger printed dots are apparent. These larger dots spell out the word "VOID," or other pre-determined textual warning.

The pantograph may be applied to the substrate to create a pre-printed carrier. An image to be protected is then applied to the pre-printed carrier. In other cases, the pantograph may be incorporated into the printed image.

A problem with the standard void pantograph is that it creates a readable message which a forger or counterfeiter can see when the original document is copied. The forger may then seek a different method for creating unauthorized copies.

Recently, fluorescent void pantographs have been developed which become visible only under UV light in the copy of an original document. To create the fluorescent void pantographs, patterns are printed with light and dark colors. These have an advantage over standard pantographs in that they are not visible (without magnification) under normal illumination, above the UV range of the spectrum. Such methods are not suitable, however, for monochrome printing devices.

The present system and method provide a method and apparatus for creating monochrome patterns for encoding information in documents and for detecting unauthorized copying. As an example, a forger or counterfeiter who tries to have a forged prescription filled can be caught at the pharmacy.

INCORPORATION BY REFERENCE

The following references, the disclosures of which are incorporated herein in their entireties by reference, are mentioned:

U.S. application Ser. No. 15/852,003, filed Dec. 22, 2017, entitled COPY IDENTIFICATION WITH ULTRAVIOLET LIGHT EXPOSURE, by Edward N. Chapman, et al., describes a pantograph mark that is visible only in a copy of an original, and only when the copy is viewed under ultraviolet light. The pantograph mark is created using standard copy paper and standard inks and toners.

U.S. Pat. No. 4,168,088 issued Sep. 18, 1979, entitled PROTECTED DOCUMENT AND METHOD OF MAKING THE SAME, by Somlyody, discloses a document for preventing unauthorized copying. A warning word is made up of small areas of substantially the same shape as a background but of a different size such that the warning word cannot be detected by a viewer, but will be visible upon reproduction by a copying machine.

U.S. Pat. No. 4,210,346, issued Jul. 1, 1980, entitled PROTECTED DOCUMENT BEARING WATERMARK AND METHOD OF MAKING, by Mowry, Jr. et al., discloses a security document adapted for use with a xerographic color which has a reproduction density threshold which at normal operator accessible copier settings reproduces dots of a tone density which are larger than the reproduction density threshold and which does not resolve and consequently does not reproduce dots of a tone density which are smaller than the threshold.

U.S. Pat. No. 5,286,286, issued Feb. 15, 1994, ENTITLED FAST-DRYING INK COMPOSITIONS FOR PRINTING CONCEALED IMAGES DETECTABLE BY FLUORESCENCE, by Francoise M. Winnik, et al.

U.S. Pub. No. 20090207433, published Aug. 20, 2009, and U.S. Pub. No. 20100150433, published Jun. 17, 2010, entitled VARIABLE DATA DIGITAL PANTOGRAPHS, by Shen-Ge Wang, et al., describe a system and method for creating digital pantographs from variable data.

U.S. Pub. No. 20090212115, published Aug. 27, 2009, entitled SYSTEM FOR EMBEDDING MACHINE-READABLE INFORMATION WITH FLUORESCENT MATERIALS, by Gabriel Iftime, et al., describes embedding machine-readable information on a substrate with fluorescent marking materials.

U.S. Pub. No. 20170039422, published Feb. 9, 2017, entitled SEMIAUTOMATIC MULTIFUNCTION DEVICE-BASED VALIDATION OF SECURE DOCUMENTS, by Reiner Eschbach, et al., describes a document validation system which uses a security template to identify the location of one or more security elements on a certified document.

BRIEF DESCRIPTION

In accordance with one aspect of the exemplary embodiment, a method includes forming an original document using a first print medium. This includes, in a first region of the first print medium, printing a first monochrome pattern with a single colorant, the printed first region including first shapes which are devoid of the colorant, and in a second region of the first print medium, printing a second monochrome pattern with the colorant, the printed second region including second shapes which are devoid of the colorant. The second shapes having a smaller size and a higher frequency than the first shapes. One of the first and second regions encodes information. The first and second patterns and a fluorescence of the first print medium are selected such that: the first and second regions of the original document are indistinguishable to the naked eye, under both normal and ultraviolet illumination and in a copy formed by scanning the original document and printing the scanned document on a second print medium with a plurality of colorants, the first and second regions of the copy are indistinguishable to the naked eye, under normal illumination, but are distinguishable to the naked eye, under the ultraviolet illumination, to reveal the encoded information.

In accordance with another aspect of the exemplary embodiment, a method for evaluating a received document to determine whether the received document is a copy of an original document is provided. The original document includes a first region in which a first monochrome pattern has been printed with a single colorant, the first region including first shapes which are devoid of the colorant, and a second region in which a second monochrome pattern has been printed with the colorant, the printed second region including second shapes which are devoid of the colorant. The second shapes have a smaller size and a higher frequency than the first shapes. One of the first and second regions encodes information. The encoded information is not revealed to the naked eye under normal illumination. The method includes illuminating the received document with ultraviolet illumination and determining that the received document is a copy when the encoded information is revealed to a naked eye under the ultraviolet illumination.

In accordance with another aspect of the exemplary embodiment, an original document includes a first print medium, a first monochrome pattern in a first region of the first print medium, the first monochrome pattern including first shapes which are devoid of colorant and a second monochrome pattern in a second region of the first print medium, the second monochrome pattern including second shapes which are devoid of colorant, the second shapes having a smaller size and a higher frequency than the first shapes. One of the first and second regions encodes information. The first and second patterns and a fluorescence of the first print medium are selected such that the first and second regions of the original document are indistinguishable to the naked eye, under both normal and ultraviolet illumination, in a copy formed by scanning the original document and printing the scanned document on a second print medium with a plurality of colorants, the first and second regions of the copy are indistinguishable to the naked eye, under normal illumination, but are distinguishable to the naked eye, under the ultraviolet illumination, to reveal the encoded information.

An apparatus for forming the original document described above may include a print media source which stores the first print medium, memory which stores the first monochrome pattern and the second monochrome pattern, instructions stored in memory for forming the first region and second region on the first print medium and a marking engine which receives the first print medium from the print media source and forms the first region and the second region on the first print medium with the same colorant, based on the instructions, to form the original document.

DETAILED DESCRIPTION

Figure 1:
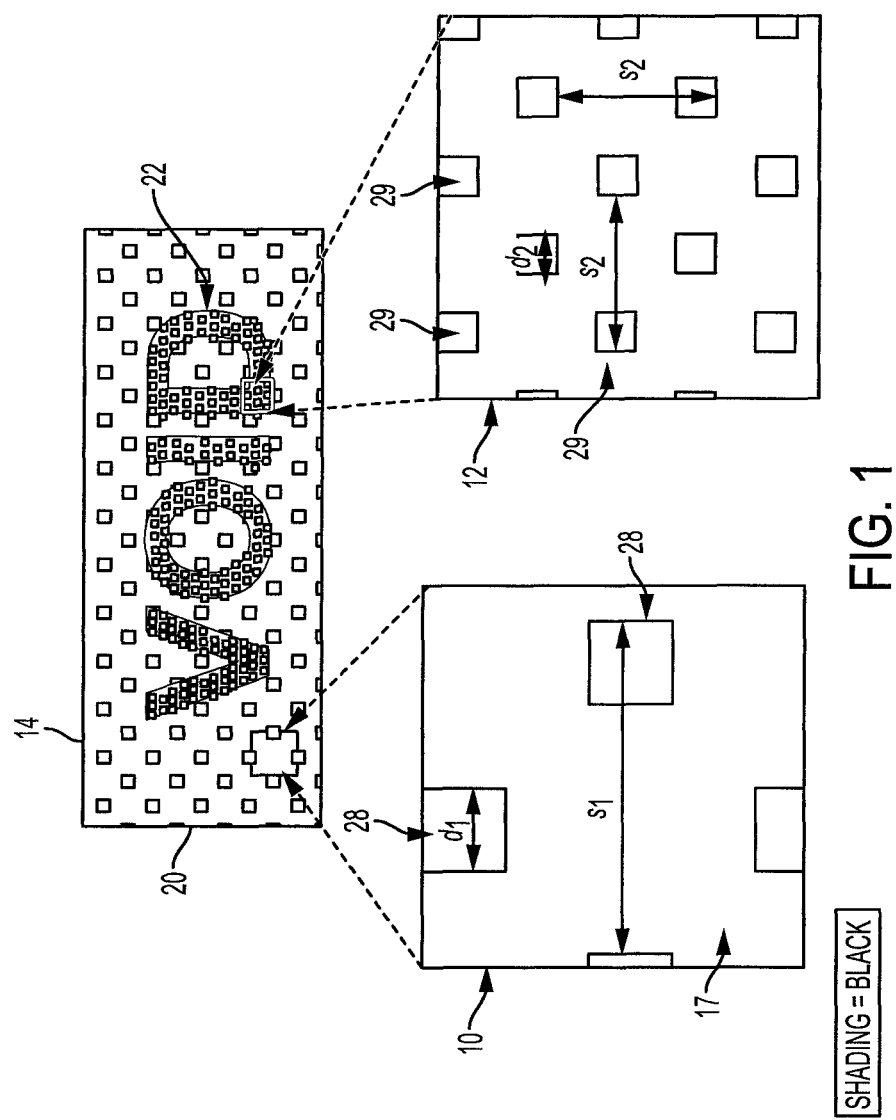
FIG. 1 illustrates example patterns for creation of a pantograph mark.

Aspects of the exemplary embodiment relate to a printing apparatus and a method for providing a monochrome pantograph mark that is visible only in a printed copy of an original document, and only when the copy is viewed under ultraviolet light, and to a method of detecting unauthorized copying. The original document containing the pantograph mark is generated using a first print media which has a lower fluorescence than a second print media (e.g., standard white copy paper) used in forming the copy. The original document containing the pantograph mark, or at least the pantograph mark part of the original document, is generated with a single colorant (marking material), such as an ink or toner particles, and can thus be printed with a monochrome printer. The ultraviolet light-detectable pantograph mark in the copy is generated with at least two colors of colorant, e.g., using a color copier.

As used herein, "ultraviolet (UV) illumination" is considered to be radiation in the wavelength range of 5 to 400 nanometers, or up to 380 nm. UV illumination may also include a small amount of light in the visible region of the spectrum (400-700 nm), but the proportion of UV radiation is substantially higher than the proportion of light in the visible region.

"Normal illumination" is considered to be light primarily in the visible region of the spectrum and includes light from incandescent, fluorescent, halogen, and/or LED light sources, and/or natural solar light. Normal illumination may also include a small amount of radiation in the UV range, but the proportion of visible light is substantially higher than the proportion of UV radiation, and higher than the proportion of visible light present in in the UV illumination.

"Visible with the naked eye" means that something can be observed by a person with normal (20:20) vision, without the aid of any magnification.

The terms "printer" or "printing apparatus," as used herein, encompass any apparatus, such as a digital copier, bookmaking machine, facsimile machine, multi-function machine, etc., which performs a print outputting function for any purpose. The details of printers are well-known and are not described in detail herein to keep this disclosure focused on the salient features presented.

The method relies upon a scanner to function as a low frequency pass filter. In general, scanners are unable to detect the color of small shapes that are spaced below the scanner's minimum resolution (or below the scanner's MTF (modulation transfer function). Some of the shapes defined on an original document are spaced above the scanner's minimum resolution (below the maximum frequency), while other shapes are below the scanner's minimum resolution (above the maximum frequency). When the original is copied, the small shapes in the higher frequency pattern are scanned as white while the larger shapes in the lower frequency pattern scan as the paper color. These differences are not visible to the naked eye when the copy is viewed under normal illumination (in the visible range of the spectrum), but under UV illumination, the difference in fluorescence between the white shapes (bare paper, devoid of colorant) and the printed shapes causes an observable difference between regions composed of these shapes.

Figure 2:
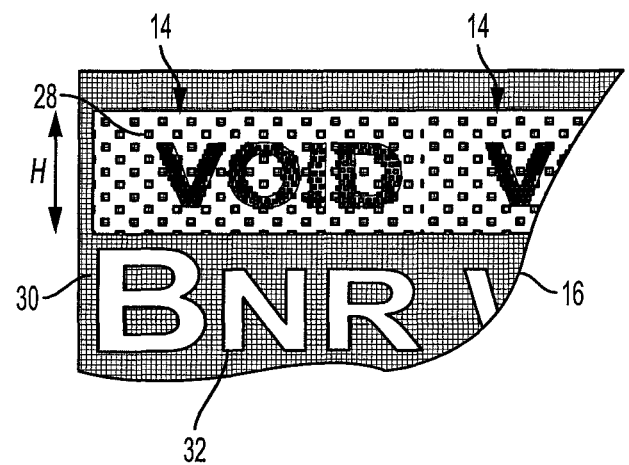
FIG. 2 illustrates an example original document incorporating a pantograph mark.
Figure 3:
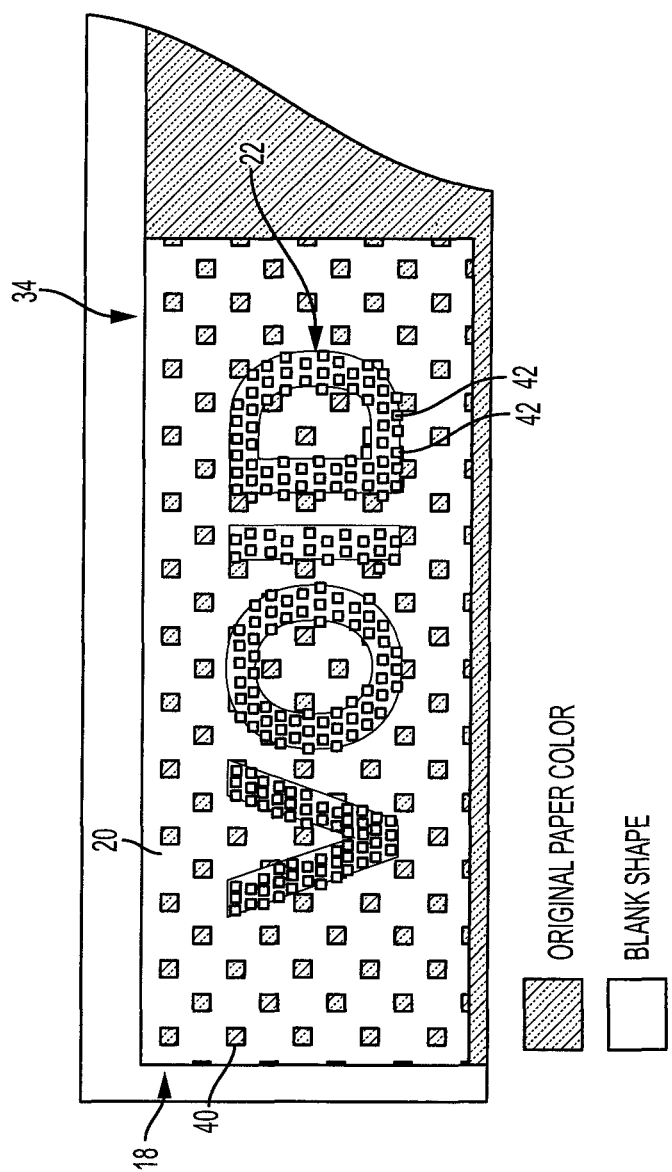
FIG. 3 illustrates a copy of an original document incorporating a pantograph mark.
Figure 4:
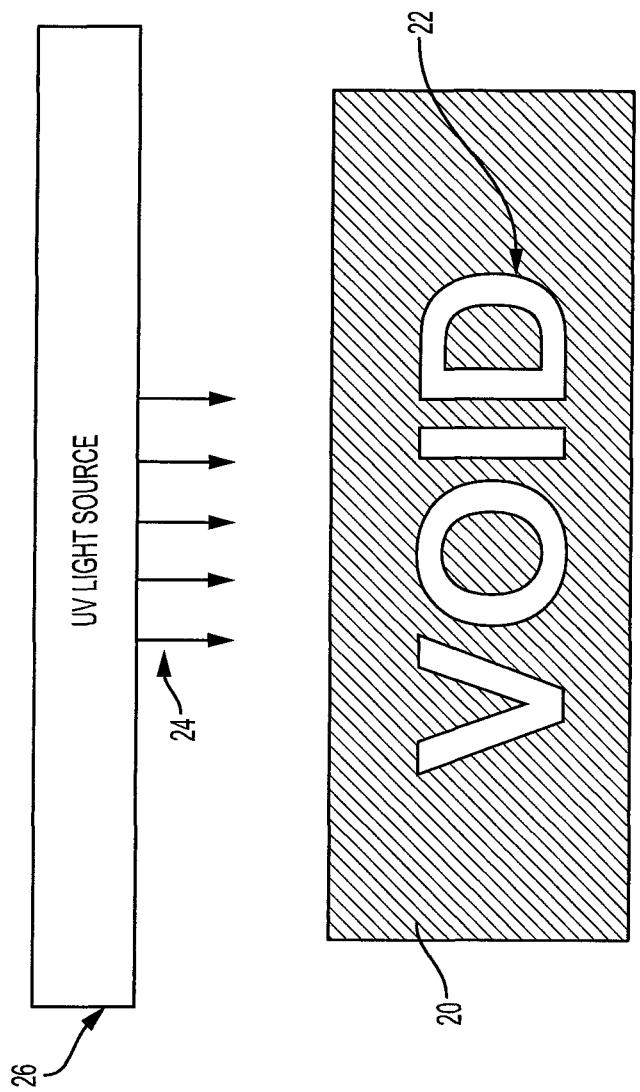
FIG. 4 illustrates viewing the pantograph in the copy of the original document under ultraviolet light.

FIG. 1 illustrates first and second monochrome patterns 10, 12, suitable for forming a digital pantograph mark 14. The pantograph mark 14 is embedded in an original document 16 (FIG. 2) by printing. The patterns 10, 12 form a metameric pair when the original document 16 is copied by a scanner and printed to form a document copy 18 (FIG. 3). By "metameric" it is meant that two regions 20, 22, created with the first and second patterns, respectively, are of matching tone under normal lighting conditions (in the visible range of the spectrum), but appear visually different under different lighting conditions, such as under UV illumination 24 from a UV source 26, such as a blacklight (FIG. 4). A blacklight is a lamp that emits long-wave (UV-A) ultraviolet light and not much visible light.

The two monochrome patterns 10, 12 both include shapes 28, 29, of which are of different size and spaced at different frequencies. In particular, the shapes 28 are larger than shapes 29 and the frequency of shapes 28 (which can be expressed as the number of shapes per linear unit in process and cross-process directions) is lower than for shapes 29. Shapes 28 have a spacing $s_1$ and size $d_1$ (e.g., largest dimension) and shapes 29 have a spacing $<s_1$ and size $d_2$, where $d_2<d_1$. Since frequency is the inverse of spacing (pitch) the spacing $s_1$ of the shapes in pattern 10 is higher than the spacing $s_2$ in pattern 12. The shapes in adjacent rows of shapes may be offset from each other, e.g., by half of the respective spacing between shapes in a row/column. While the shapes are illustrated as rectangles, specifically, squares, any suitable shape which includes one, two or more contiguous pixels, when printed, can be employed, such as a, triangle, diamond, multisided shape, circle or irregular shape. The shapes 28, 29 may have the same aspect ratio (the ratio of number of pixels in height to number of pixels in width), which is 1 in the case of the illustrated squares. The shapes 28 in the first pattern and the shapes 29 in the second pattern are both selected so as to occupy a smaller proportion of the first and second regions 20, 22 than the colorant.

The frequency of the shapes 28 in the first pattern 10 is below the scanner's MTF (Modulation transfer function) low pass frequency and the frequency of the shapes 29 in the second pattern 12 is above the scanner's MTF low pass frequency. The shapes 28, 29, are to be left blank, when printed, while the remainder 17, 19 of each pattern is to be marked with the monochrome colorant. The background 17, 19 is the same color in the first and second patterns, and the only difference between the first and second patterns is the spacing/frequency and size of the shapes.

The shapes 28, 29 are of small size when printed, such as less than 0.5 mm in both height and width, or up to 0.3 mm in both height and width, so that the patterns are hidden to the naked eye. For example, $d_1 \leq 0.5$ mm or $\leq 0.3$ mm and $d_2 \leq 0.3$ mm or $\leq 0.2$ mm. A ratio of $d_1:d_2$ may be at least 1.5:1 or at least 1.7:1 or up to 10:1 or up to 5:1. A ratio of the area of shape 28: area of shape 29 may be at least 2:1 or at least 3:1.

The illustrated pantograph mark 14 includes a background region 20 which is formed from one of the two patterns, such as pattern 10, and a foreground region which is formed from the other of the two patterns, such as pattern 12. The foreground region includes information, e.g., in the form of text characters, such as the word "VOID". However, other symbols which are selected as indicating an unauthorized copy are also contemplated, such as a ring with a diagonal bar across. The foreground region 22, containing the information, may be 0.2-0.8 cm in height H, such as 0.3-0.6 cm, when printed.

Although the foreground region 22 of the pantograph mark is clearly distinguishable from the background region 20 in FIG. 1, this is for illustrative purposes only. In practice the foreground region 22 appears indistinguishable from the background region 20 in the original document 16 since the two regions 20, 22 have the same tone, such as a grey tone in the case of black colorant.

To form the original document 16, the pantograph 14 is printed on a first print medium 30, such as paper, by monochrome printing. Specifically, the shapes 28, 29 are left blank, while the rest of the pantograph is printed a uniform single color, such as black. Other content 32 is printed on the first print medium 30, such as text, images or the like, generally spaced from the pantograph (FIG. 2). The content 32 may be printed in the same printing process as the pantograph 14, or may be incorporated in the document by a separate printing process, before or after the pantograph is formed. For example, sheets of print media 30, with the pantograph 14 preprinted thereon, may be supplied for overprinting with content 32 of the printer's choice, which can be monochrome or color.

To form the copy 18, the original document 16 is scanned and printed (which may be referred to herein simply as copying) on a second print medium 34, such as paper, which has a higher fluorescence than the first print medium. By "higher fluorescence," it is meant that under UV illumination, the second print medium 34 converts incident UV light to light in the visible range of the spectrum to a greater degree than the first print medium 30.

Fluorescence of paper can be detected with a fluorometer. The paper is illuminated with a filtered radiation source (e.g., in the UV range) and the light reflected from the paper (or alternatively the absorbance) is measured with a photocell reflector. See, for example, G. F. Bailey, "Instrument for the Measurement of Fluorescence of Paper Chromatographic Spots," Anal. Chem., 32 (12), pp 1726-1727 (1960). A ratio of the amount of detected light measured for the original, unprinted paper: light for the unprinted copy paper may be less than 0.95:1, for example, or up to 0.9:1.

In one embodiment, the first print medium 30 may be a colored paper with fluorescent properties less than white print media 34 that is conventionally used in copying. For good results, the colored paper 30 is light in color, such as a pale yellow, pale blue, pale pink, grey, or beige. However, any color of paper which is not likely to be detected by a scanner in the small shapes 29 may be used. The color of the first print medium may thus be visibly different to the naked eye, under normal illumination, from that of the second print medium, which is generally white.

Alternatively, or additionally, the first print medium 30 may include a lower quantity of optical brighteners than the second print medium 34. Optical brighteners are chemical compounds that absorb light in the ultraviolet and violet region (usually 340-370 nm) of the electromagnetic spectrum, and re-emit light in the blue region (typically 420-470 nm), by fluorescence. Compounds with this property include stilbenes, e.g., 4,4'-diamino-2,2'-stilbenedisulfonic acid, and umbelliferone. Since natural light includes some light in the UV range, nominally "white" paper treated with an optical brightener can emit more visible light than that which shines on it, making it appear brighter and compensating for any slight yellow tint of the paper. For example, the first print media 30 may have less than 20% or less than 10% of the optical brighteners present in the copy paper 34 and/or a difference in color value of at least 2, or at least 5, or at least 10, such as up to 50, in one or both of its a* and b* values (in the CIE 1976 (L*, a*, b*) color space), from the copy paper 34, as measured according to ASTM E1347-06(2015), "Standard Test Method for Color and Color-Difference Measurement by Tristimulus Colorimetry". Additionally, or alternatively, the L* values may differ by at least 10 or at least 15. For example, the copy paper may have L*a*b* values at or close to (100,0,0), while the first print medium 30 may have L*a*b* values such as (80,2,1) or (75,5,10). L* values may exceed 100 in copy papers which incorporate optical brighteners.

As will be appreciated, it is not known precisely what type of copy paper 34 an unauthorized person will use to form the copy 18 or the resolution of the scanner. However, the first print medium 30 can be selected, or made, to have lower fluorescence properties than standard copy paper 34 in common use or expected to be used, at commonly-achievable scanner resolutions. By ensuring a significant difference in fluorescence between the print media 30 and commonly-available copy papers 34, the method can tolerate a range of different copy papers.

When the original document 16 is scanned, the shapes, 28, 29 in the background and foreground regions 20, 22, of the pantograph 14 are recorded differently by the scanner. In the region (e.g., background region 20) incorporating the first pattern 10, the large shapes 28 are recorded as filled shapes 40, roughly corresponding in location and shape to the shapes 28, and having a color corresponding to the color of the print media 30. When printed with a printer which uses a plurality of colorants (i.e., at least two colorants, such as three or four colorants), most or all of shapes 40 are therefore filled with a corresponding colorant, i.e., a color that is the same as (or close to) the color of the underlying media 30. In the region 22 incorporating the second pattern 12, the small shapes 29 are recorded by the scanner as being blank (or white), and so are not printed with colorant when the scanned document is printed to form the copy 18. Rather, they are left as holes 42, roughly corresponding in location and shape to the shapes 29. The scanner is thus able to detect the existence of the small shapes, but not their color. The difference between regions 20, 22 of the copy 18 is not observable, to the naked eye, under normal illumination, since both regions appear as a similar gray tone. In the region 22 of the copy, the shapes 42, where no colorant has been applied, allow the underlying print media 34 to fluoresce, under UV illumination, giving the region 22 a different appearance to the background region 20. The background region 20, which is substantially or entirely covered with the two colorants, blocks the UV light from reaching the print media 34, and thus responds differently to the UV illumination. As a result, the copy 18, formed by scanning and printing the original document with a plurality of colorants, but not the original 16, has the fluorescent void pantograph. In particular, the first and second regions 20, 22 of the original document are indistinguishable to the naked eye, under normal illumination and under ultraviolet illumination containing more UV light, but are distinguishable to the naked eye, in the copy, but only under the ultraviolet illumination, to reveal the encoded information.

Figure 5:
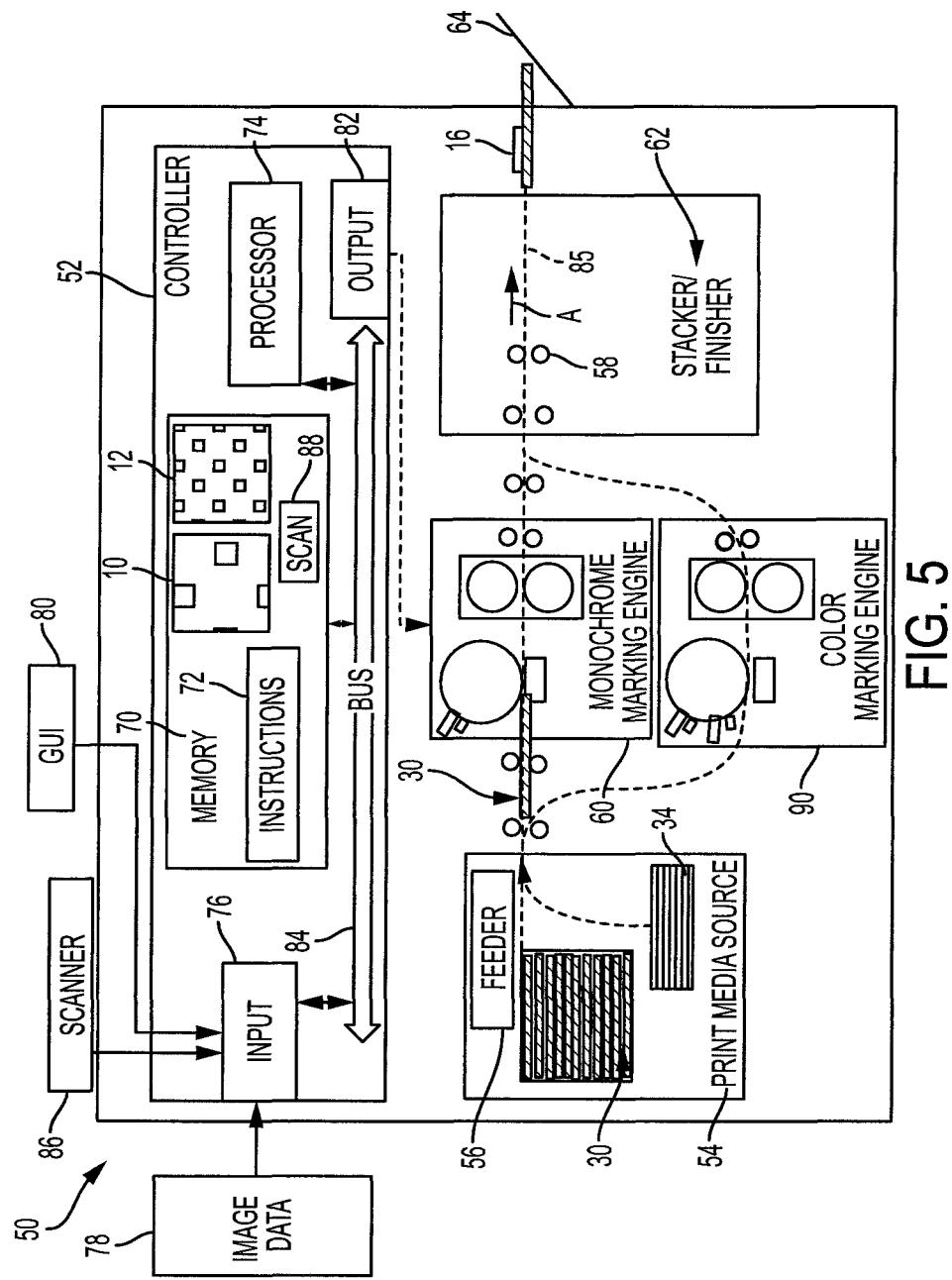
FIG. 5 is a functional block diagram which illustrates an apparatus for incorporating a pantograph mark in an original document.

FIG. 5 illustrates a printing apparatus 50 suitable for generating an original document 16 with a pantograph mark 14 thereon. The apparatus includes a controller 52, a source 54, of low fluorescence print media 30, a print media feeder 56, a transport mechanism 58, a marking engine 60, optionally one or more post printing components 62, such as a stacker, collator, finisher, binder, or the like an output device 58, such as a tray.

The controller 52 includes memory 70 which stores the first and second patterns 10, 12 from which a pantograph can be generated, and/or a pantograph 14 formed therefrom. The memory 70 may further include instructions 72 for rendering the pantograph on print media. A processor 74, in communication with the memory, executes the instructions. The controller may include an input device 76 for receiving image data 78 to be rendered as printed content 32 on the print media 30. A graphical user interface (GUI) 80 may be provided for a user to input instructions for rendering the pantograph 14 and/or image 32 on the print media. The controller includes an output 82 for sending instructions to the marking engine 60 for rendering the pantograph 14 and optional image 32 on the print media. Hardware components 76, 72, 74, 82 of the controller may be communicatively connected by a data/control bus 84. As will be appreciated, the controller, or parts thereof, may be remote from the rest of the printing apparatus 50, e.g., on a remote server connected with the other parts of the printing apparatus.

The feeder 56 supplies the light-colored print media 30, e.g., in sheet form, to the transport system 58, which may be composed of rollers, belts, or the like. The transport system 58 conveys the print media 30 along a paper path 85, in the direction of arrow A, to the marking device 60, where the pantograph 14 and optional image 32 is printed on the print media. The pantograph 14 may be printed multiple times on the same document. The exemplary marking device 60 is a monochrome marking device, such as an inkjet marking device, employing a single ink, such as black ink, or a xerographic marking device, employing a single toner type, such as black toner. However, a color marking device may alternatively be used. The printed original 16 is conveyed, by the transport system 58, from the marking device to the output device 64.

In one embodiment, the printing apparatus 50 (or a separate printing apparatus) is configured for forming a copy of the original document 16. The printing apparatus includes a scanner 86 which generates a digital scan 88 of the original document, which may be temporarily stored in memory 70. The scan is rendered on print media 34, supplied by the print media source 54, on a color making engine 90 which prints in two or more colors. The printing apparatus outputs the copy 18, which can then be examined under normal illumination, to make sure the embedded information is not visible to the naked eye, and examined under UV illumination, where the embedded information should be visible. If the copy fails either of these two tests, changes may be made to the patterns 10, 12 and/or the print media 30 selected, for the original document.

Figure 6:
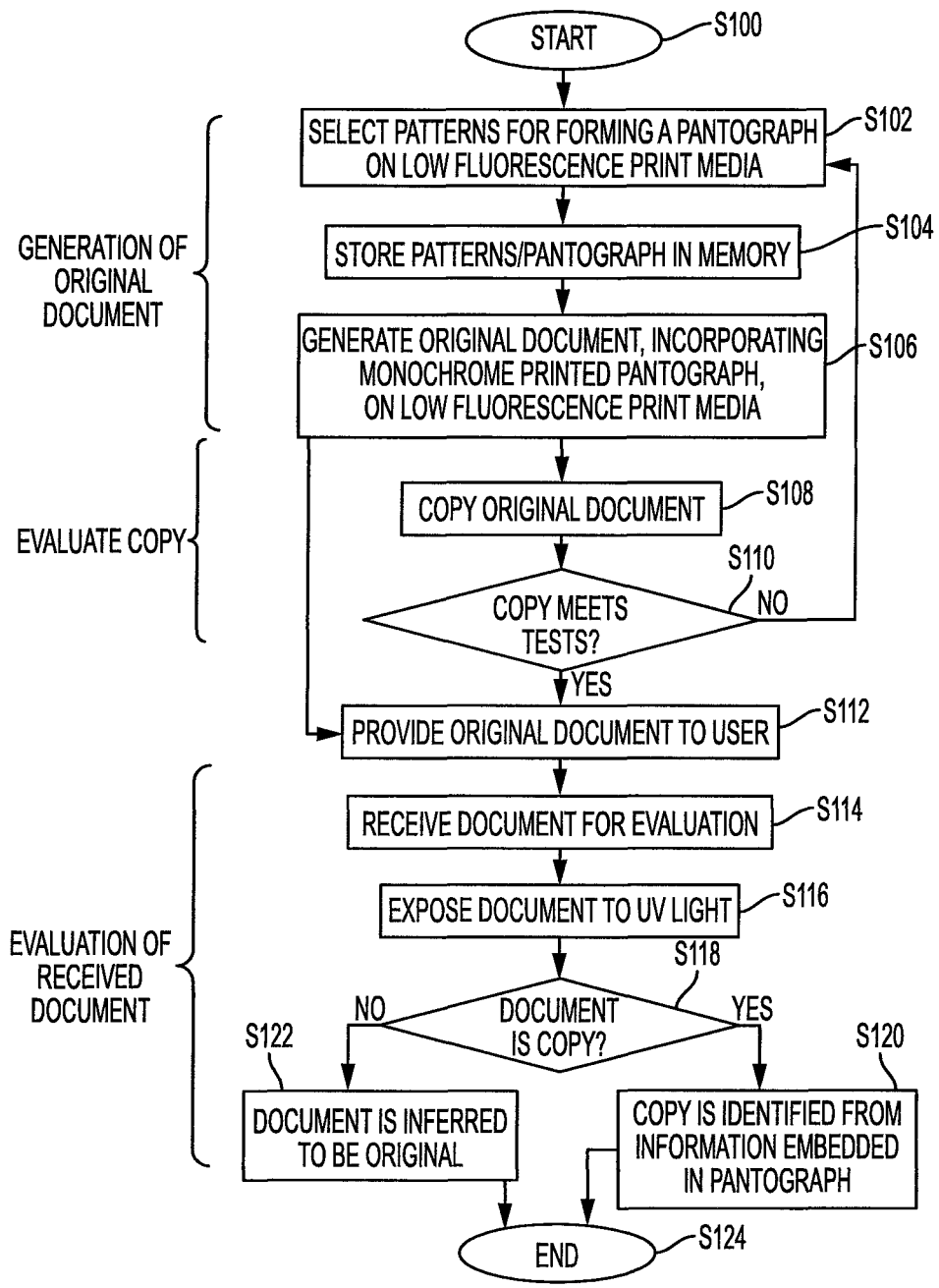
FIG. 6 is a flow chart which illustrates a method for incorporating a pantograph mark in an original document.

FIG. 6 illustrates a method of printing and detecting a pantograph in an unauthorized copy in accordance with the exemplary embodiment. The method begins at S100.

At S102, two patterns 10, 12 are selected for forming a pantograph 14 on a given type of paper 30 which, when an original document 16 is copied on copy paper 34, will convey information when the copy 18 is exposed to ultraviolet light. This may include printing a set of patterns or pantographs with different sized shapes 28, 29, to identify two of the set of patterns which are above and below a conventional scanner's MTF (modulation transfer function), respectively. The optimal patterns 10, 12 may vary depending on the choice of non-white paper 30 to be used to form the original document 16. Several copy papers 34 and/or several conventional scanners may be used in the tests so that the patterns which are most generally suitable can be identified these methods determine the minimum resolution of the scanner. In some embodiments, the scanner resolution can be manually supplied or automatically determined by processor in communication with the scanner. The scanner resolution may be set according to prevailing industry standards for scanner resolution (and periodically updated as scanner resolutions generally increase), etc. This allows selection of patterns 10, 12 appropriate to currently available scanners.

At S104, the selected first and second patterns 10, 12, and or a pantograph 14 formed therefrom are stored in memory. If only the patterns are stored, templates may also be stored for generating a variable pantograph 14, given instructions provided by a user.

At S106, an original document 16 is generated in physical form. This may include generating a digital document in which the first and second patterns are positioned adjacent to each other as a complementary pair of non-overlapping regions 20, 22 of a digital pantograph. The digital document, containing the pantograph 14, is rendered with a single colorant on the selected colored paper 30. Other content 32 may also be generated in the original document 16, before, during, or after the pantograph is rendered, e.g., with the same monochrome marking engine 60.

In some embodiments, prior to issuing original documents 16 to users, a check is made. This includes copying the original document by scanning it with a scanner 86 and printing the scan 88 with a color marking engine 90 (S108). The copy 18 is then evaluated (S110) to make sure that the embedded information (VOID) is not detectable to the naked eye (the regions 20, 22 are indistinguishable) under normal illumination, but that the embedded information is detectable (the regions 20, 22 are distinguishable) under UV illumination. If either or both of these tests is not met, the method may return to S102, where one or both patterns 10, 12 may be changed and/or a different paper color is selected for printing the original. The tests are repeated on the new original document. If the tests are met, the method proceeds to S112, where an original document that meets the tests (i.e., is formed with patterns 10, 12 and paper 30 found suitable for meeting the tests) is provided to a user.

To a human observer who receives the original document 16, the pantograph 14 appears as a uniform shaded area of the original to the human observer, when viewing the original document without magnification, under both normal illumination and under. UV illumination. A recipient may therefore infer that the received document lacks security information and the recipient may form an unauthorized copy 18 of the original, e.g., for use as a pharmacy prescription or financial instrument, depending on the purpose of the original. In copying, the copier used (e.g., at its maximum resolution) detects the larger spacing interval and/or size of the shapes 28 in the first pattern, and prints the shapes with colorant, such as beige, yellow, etc. The smaller spacing interval and/or size of the shapes 29 in the second pattern are not detected and these shapes are left blank (unprinted). The unauthorized copier will likely not suspect that the copy 18 encodes security information, such as the word "VOID," since the region of the copy containing the pantograph 14 has substantially the same uniform appearance as that of the original, under normal illumination.

At some time later, an evaluation is performed of a document which may be the original document or may be a copy thereof created by an unauthorized user. At S114, such a document is received for evaluation. To the naked eye, under normal illumination, it cannot be determined whether it is a copy 18 or the original document 16 (either of which may include, at this stage, additional content formed after printing, such as a pharmacy prescription, a signature, or the like).

At S116, the received document is exposed to UV illumination, e.g., from a blacklight 26. If the document is a copy 18 (S118), the region 22 of the pantograph 14 formed using the second pattern 12 is detectably different from the region 20 formed using the first pattern 10 (S120). In particular, the shapes 42 on the copy 18 that are devoid of ink or toner expose the underlying high fluorescence print media 34, allowing the standard fluorescence of the print media to reflect/fluoresce ultraviolet light in these areas of the copy. This may be observed as a glow, with the word "VOID" for example, being readily observable. In contrast, the shapes 40 on the copy 18 that are printed with ink or toner do not expose the underlying high fluorescence print media 34, resulting in a much lower fluorescence in the corresponding region(s) 20 of the copy. The print media 34 may have 5 times, 10 times, 50 times, or 100 times the fluorescence to ultraviolet light relative to the first print media and relative to standard inks and toners (e.g., RGB, CMYK, etc.). This causes exposed areas of print media 34 to appear much brighter, relative to areas of the print media that are covered with ink or toner.

On the other hand, if at S118, the received document is an original document 16, then under UV illumination, there is no difference, to the naked eye, between the regions 20, 22, since both regions will fluoresce to approximately the same extent. The received document is therefore inferred to be the original document 16 (S120).

Different actions may be taken based on whether the document is inferred to be an original or a copy. For example, an inferred original document containing a pharmacy prescription may be filled by a pharmacist, while in the case of a copy, the bearer may be reported to the police, the prescription not filled, or other appropriate action taken:

The method ends at S124.

The computer implemented steps of the method illustrated in FIG. 6 may be implemented in a computer program product that may be executed on a computer. The computer program product may be a non-transitory computer-readable recording medium on which a control program is recorded, such as a disk, hard drive. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge and the like, or any other non-transitory medium from which a computer can read and use.

EXAMPLE

Figure 7:
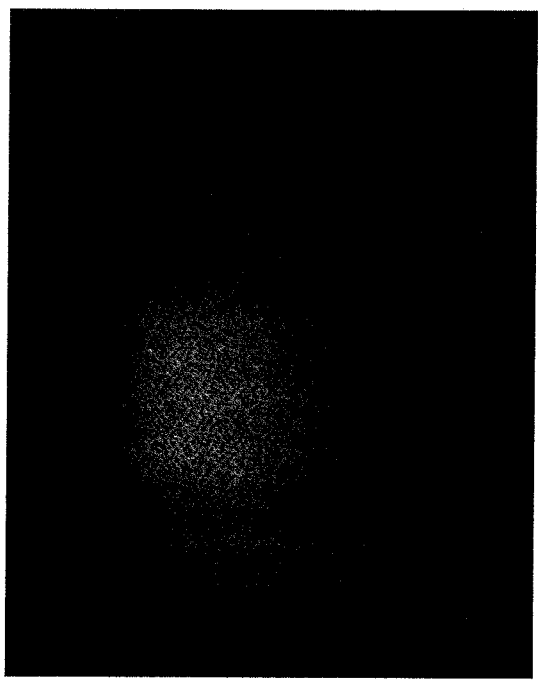
FIG. 7 is a photograph of an original document containing a VOID pantograph under UV illumination.
Figure 8:
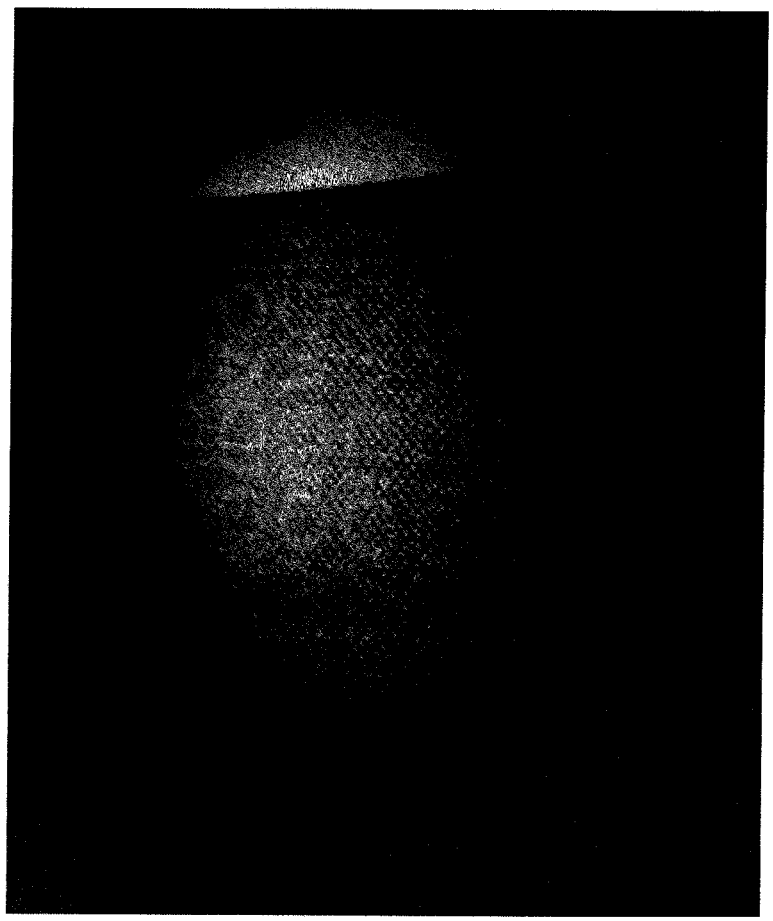
FIG. 8 is a photograph of a copy of the original document containing the VOID pantograph under UV illumination.

The method has been evaluated on pantographs containing the word VOID. The original document is generated with black colorant on yellow paper. The word VOID is clearly visible in the color copy under UV illumination, but not under normal illumination. FIG. 7 shows the original document under UV light and FIG. 8 a corresponding copy under UV light.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method comprising:
   forming an original document using a first print medium comprising:
      in a first region of the first print medium, printing a first monochrome pattern with a single colorant, the printed first region including first shapes which are devoid of the colorant, and
      in a second region of the first print medium, printing a second monochrome pattern with the colorant, the printed second region including second shapes which are devoid of the colorant, the second shapes having a smaller size and a higher frequency than the first shapes, one of the first and second regions encoding information;
   the first and second patterns and a fluorescence of the first print medium being selected such that:
      the first and second regions of the original document are indistinguishable to a naked eye, under both normal and ultraviolet illumination; and
      in a copy formed by scanning the original document and printing the scanned document on a second print medium with a plurality of colorants, the first and second regions of the copy are indistinguishable to the naked eye, under normal illumination, but are distinguishable to the naked eye, under the ultraviolet illumination, to reveal the encoded information.

2. The method of claim 1, wherein the second print medium has a higher fluorescence than the first print medium.

3. The method of claim 2, wherein the first print medium has a color which is visibly different to the naked eye, under normal illumination, from a color of the second print medium.

4. The method of claim 2, wherein the first print medium contains a smaller quantity of optical brighteners than the second print medium.

5. The method of claim 1, further comprising evaluating a received document to determine whether the received document is a copy of the original document, comprising:
   illuminating the received document with the ultraviolet illumination; and
   if the encoded information is revealed under the ultraviolet illumination determining that the received document is a copy, otherwise, inferring that the received document is the original document.

6. The method of claim 1, wherein the information is encoded by the second region.

7. The method of claim 1, further comprising:
   determining a minimum resolution of a scanner for shapes without colorant formed on the first print medium;
   setting a first spacing of the first shapes above the minimum resolution of the scanner; and
   setting a second spacing of the second shapes below the minimum resolution of the scanner.

8. The method of claim 7, further comprising generating the first pattern of first shapes at the first spacing and the second pattern of second shapes at the second spacing.

9. The method of claim 1, wherein the first region and the second region form a pantograph.

10. The method of claim 1, further comprising:
    scanning the original document to form a scan;
    printing the scan on the second print media to form a copy;
    evaluating the copy to determine whether the embedded information is:
       a) not detectable under normal illumination;
       b) detectable under ultraviolet illumination.

11. The method of claim 10, further comprising:
    where at least one of a) and b) is not met, changing at least one of:
       at least one of the first and second patterns; and
       the first print medium.

12. The method of claim 1, wherein the normal illumination has a larger proportion of radiation in a visible range of an electromagnetic spectrum than the ultraviolet illumination, the visible range of the electromagnetic spectrum being from 400 to 700 nanometers.

13. The method of claim 1 wherein the shapes in the first pattern and the shapes in the second pattern have a same aspect ratio.

14. The method of claim 1 wherein the shapes in the first pattern and the shapes in the second pattern are rectangles.

15. The method of claim 1 wherein the shapes in the first pattern and the shapes in the second pattern occupy a smaller proportion of the first and second regions than the colorant.

16. An original document formed by the method of claim 1, comprising:
    a first print medium;
    a first monochrome pattern in a first region of the first print medium, the first monochrome pattern including first shapes which are devoid of colorant; and
    a second monochrome pattern in a second region of the first print medium, the second monochrome pattern including second shapes which are devoid of colorant, the second shapes having a smaller size and a higher frequency than the first shapes, one of the first and second regions encoding information;
    the first and second patterns and a fluorescence of the first print medium being selected such that:
       the first and second regions of the original document are indistinguishable to a naked eye, under both normal and ultraviolet illumination;
       in a copy formed by scanning the original document and printing the scanned document on a second print medium with a plurality of colorants, the first and second regions of the copy are indistinguishable to the naked eye, under normal illumination, but are distinguishable to the naked eye, under the ultraviolet illumination, to reveal the encoded information.

17. An apparatus for performing the method of claim 1, comprising:
    a print media source which stores the first print medium;
    memory which stores the first monochrome pattern and the second monochrome pattern;

instructions stored in memory for forming the first region and second region on the first print medium; and a marking engine which receives the first print medium from the print media source and forms the first region and the second region on the first print medium with the same colorant, with the instructions, to form the original document.

18. The apparatus of claim 17, further comprising:
a scanner which scans the original document;
a print media source storing the second print medium;
a color marking engine which receives the second print medium from the print media source and forms a copy of the scanned original document.

19. A method for evaluating a received document to determine whether the received document is a copy of an original document, the original document including a first region in which a first monochrome pattern has been printed with a single colorant, the first region including first shapes which are devoid of the colorant, and a second region in which a second monochrome pattern has been printed with the colorant, the printed second region including second shapes which are devoid of the colorant, the second shapes having a smaller size and a higher frequency than the first shapes, one of the first and second regions encoding information, the encoded information not being revealed to a naked eye under normal illumination, the method comprising:

illuminating the received document with ultraviolet illumination; and determining that the received document is a copy when the encoded information is revealed to a naked eye under the ultraviolet illumination.

20. The method of claim 19, wherein the received document is inferred to be the original document when the encoded information is not revealed to a naked eye under the ultraviolet illumination.

* * * * *